US012739304B1

(12) United States Patent
Hartshorn et al.

(10) Patent No.: US 12,739,304 B1
(45) Date of Patent: Sep. 15, 2026

(54) SYSTEMS AND METHODS FOR PERSONALIZED FOG NETWORKS

(71) Applicant: United Services Automobile Association (USAA), San Antonio, TX (US)

(72) Inventors: Joel S. Hartshorn, Port Orchard, WA (US); Elena Marie Carrasco, Converse, TX (US); Nathan Lee Post, Rockport, TX (US); Mark Paxman Warnick, San Antonio, TX (US); Ravi Durairaj, San Antonio, TX (US); Nolan Serrao, Plano, TX (US); Sumita T. Jonak, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 107 days.

(21) Appl. No.: 17/955,192

(22) Filed: Sep. 11, 2022

Related U.S. Application Data

(60) Provisional application No. 63/249,987, filed on Sep. 29, 2021, provisional application No. 63/250,008, filed on Sep. 29, 2021, provisional application No. 63/249,997, filed on Sep. 29, 2021, provisional application No. 63/250,000, filed on Sep. 29, 2021.

(51) Int. Cl.

| | |
|---|---|
| ***G06F 15/16*** | (2006.01) |
| ***H04L 67/104*** | (2022.01) |
| ***H04L 67/1061*** | (2022.01) |
| ***H04L 67/125*** | (2022.01) |

(52) U.S. Cl.
CPC ........ *H04L 67/125* (2013.01); *H04L 67/1046* (2013.01); *H04L 67/1061* (2013.01)

(58) Field of Classification Search
CPC ............... H04L 67/125; H04L 67/1046; H04L 67/1061
USPC .......................................................... 709/217
See application file for complete search history.

(56) References Cited

U.S. PATENT DOCUMENTS

| | | | | |
|---|---|---|---|---|
| 2002/0071427 | A1* | 6/2002 | Schneider | H04L 65/1104 370/352 |
| 2009/0180444 | A1* | 7/2009 | McManus | H04W 36/302 370/332 |
| 2010/0080201 | A1* | 4/2010 | Rosenblatt | H04W 4/18 370/338 |
| 2010/0259389 | A1* | 10/2010 | Marshall | G08B 21/24 340/572.1 |
| 2013/0297835 | A1* | 11/2013 | Cho | G06F 3/0634 710/14 |
| 2017/0052522 | A1* | 2/2017 | Klein | H04L 67/34 |
| 2017/0105101 | A1* | 4/2017 | Santavicca | H04B 17/318 |
| 2017/0290068 | A1* | 10/2017 | VanBlon | H04W 72/52 |
| 2018/0173570 | A1* | 6/2018 | Chintalapally | G06F 9/4881 |
| 2018/0190271 | A1* | 7/2018 | Bhaya | H04L 65/762 |
| 2018/0227199 | A1* | 8/2018 | Liu | H04L 67/12 |
| 2018/0336277 | A1* | 11/2018 | Alsina | G06F 16/9024 |
| 2019/0044918 | A1* | 2/2019 | Doshi | H04W 12/02 |
| 2019/0180770 | A1* | 6/2019 | Kothari | G06F 3/167 |
| 2019/0292839 | A1* | 9/2019 | Kim | G01S 13/08 |
| 2019/0356743 | A1* | 11/2019 | Park | H04W 4/70 |

(Continued)

*Primary Examiner* — Thuong Nguyen
(74) *Attorney, Agent, or Firm* — Fletcher Yoder, P.C.

(57) ABSTRACT

Systems and methods are provided for managing smart devices via a local fog network. Device eligibility for joining the network is determined based upon characteristics of a discovery poll ping response.

20 Claims, 8 Drawing Sheets

(56) References Cited

U.S. PATENT DOCUMENTS

| | | | | |
|---|---|---|---|---|
| 2020/0162785 | A1* | 5/2020 | Gentile | G06F 13/22 |
| 2020/0290626 | A1* | 9/2020 | Chen | G01S 11/06 |
| 2021/0029106 | A1* | 1/2021 | Breitenbach | H04W 36/14 |
| 2022/0014932 | A1* | 1/2022 | Satheesh Kumar | H04W 24/10 |
| 2022/0028538 | A1* | 1/2022 | Auerbach | G16H 40/20 |
| 2022/0069925 | A1* | 3/2022 | Yates | H04B 17/318 |
| 2022/0156495 | A1* | 5/2022 | Kwatra | G06V 10/70 |
| 2022/0279311 | A1* | 9/2022 | Luo | H04W 4/029 |
| 2022/0368776 | A1* | 11/2022 | Paranjpe | H04L 67/5681 |
| 2023/0058016 | A1* | 2/2023 | Wood | H04L 63/08 |
| 2023/0116322 | A1* | 4/2023 | He | A63F 13/46 463/23 |

* cited by examiner

SYSTEMS AND METHODS FOR PERSONALIZED FOG NETWORKS

CROSS-REFERENCE TO RELATED APPLICATION

This application claims priority to and the benefit of U.S. Provisional Patent Application No. 63/249,987, entitled "SYSTEMS AND METHODS FOR PERSONALIZED FOG NETWORK", U.S. Provisional Patent Application No. 63/249,997, entitled "SYSTEMS AND METHODS FOR PERSONALIZED FOG NETWORK", U.S. Provisional Patent Application No. 63/250,008, entitled "SYSTEMS AND METHODS FOR DISTRIBUTED IDENTITY SERVICES", and U.S. Provisional Patent Application No. 63/250,000, entitled "DECENTRALIZED IDENTITY", all filed Sep. 29, 2021, which are herein incorporated by reference in their entirety.

BACKGROUND

The present disclosure relates generally to systems and methods for generating and using personalized fog networks in a user environment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Fog computing refers to distributed computing where devices connect to a local cloud. Many of these devices will generate raw data (e.g., from sensors). Rather than forwarding this data to cloud-based servers to be processed, the idea behind fog computing is to do as much processing as possible using computing units co-located with the data-generating devices, so that processed rather than raw data is forwarded, and bandwidth requirements are reduced. An additional benefit is that the processed data is most likely to be needed by the same devices that generated the data, so that by processing locally rather than remotely, the latency between input and response is minimized. At some point, the processed data is typically sent to external cloud services, rendering the data vulnerable to nefarious and/or unauthorized use.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, smart devices oftentimes rely on smart device services in the cloud for data collection and/or processing. Further, data sharing may be facilitated through such smart device services to other service providers. However, this transmission of data to the smart device services and/or through sharing of data between service providers may be inefficient and/or provide security holes, enabling unauthorized access to smart device data. Accordingly, it is now recognized that a personal fog machine that provides a local fog network to obtain, aggregate, and/or supply such smart device data may provide efficient and more secure smart device data access.

Figure 1:
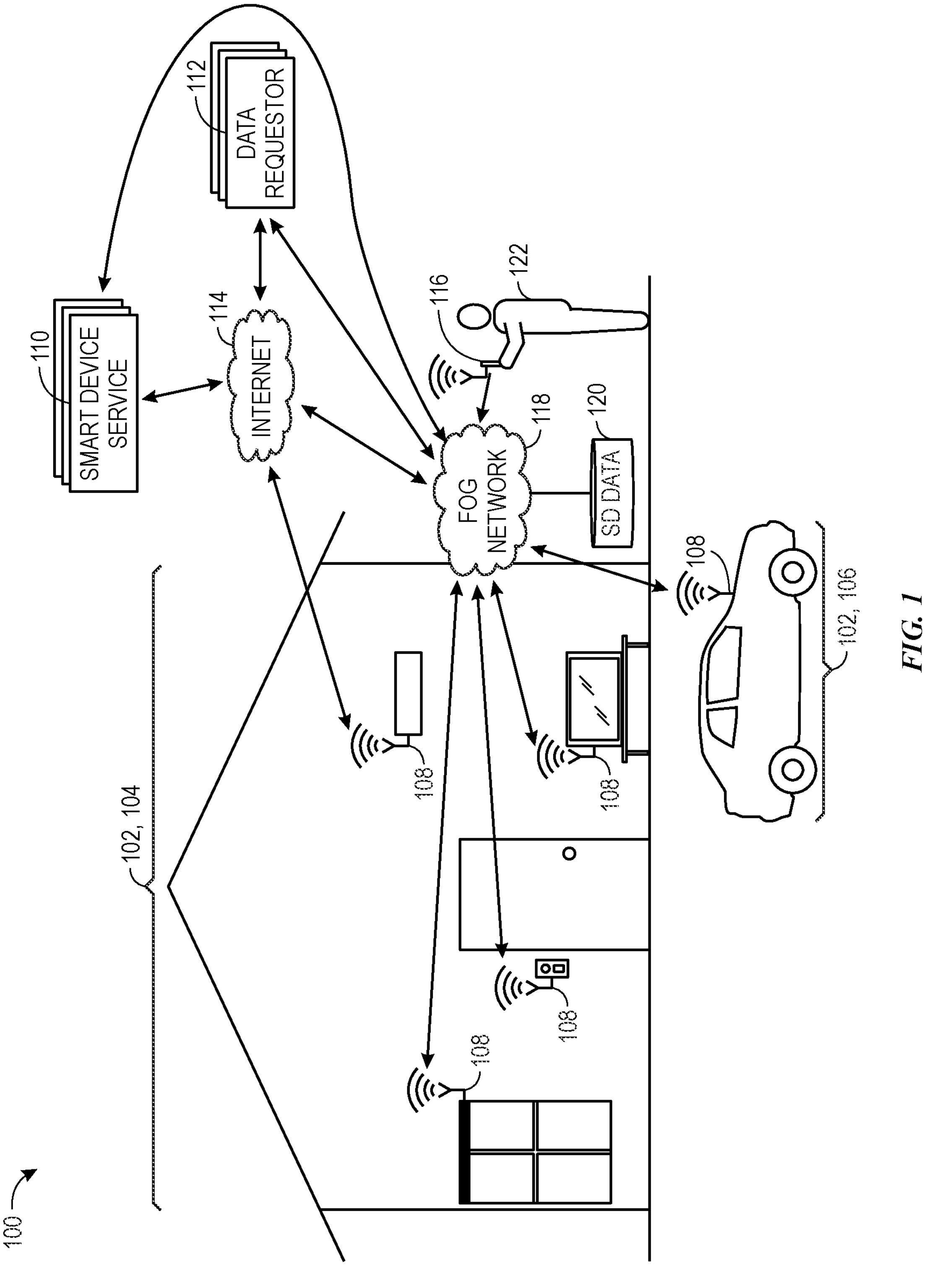
FIG. 1 is a schematic diagram of a personal fog machine system that can directly grant access to data and facilitate data transactions amongst smart devices, in accordance with certain embodiments described herein.

With this in mind, FIG. 1 is a schematic diagram of a personal fog machine system 100 that can directly grant access to and/or provide data and facilitate data transactions amongst smart devices, in accordance with certain embodiments described herein. As illustrated, an environment 102 (e.g., home 104 and/or vehicle 106) may include many devices 108 enabled for electronic communication of captured data. In traditional implementations of such devices, especially when multiple vendors are involved, the devices 108 electronically communicate captured data to smart device services 110 and/or other data requestors 112 via a non-personal network, such as the Internet 114. However, as mentioned above, this may result in large amounts of personal data being transferred to the smart device services 110, via a non-personal network, which may result in unauthorized access and/or sharing of the data with other entities.

To counteract these potential issues, a personal fog machine 16 may be employed to generate a local fog network 118 with access to a smart device data store 120. The local fog machine 16 may be implemented via software and/or hardware on a smart device, such as cellular phone or other electronic device. The fog network 118 may facilitate communications between the devices 108 without communication through other networks, such as the Internet 114 and may store received smart device data in the smart device data store 120. As may be appreciated, this may result in efficient communication of data, by providing local transmission of smart device data, as compared to a relatively longer transmission via the Internet 114 or other non-personalized service.

Further, increased security may be provided via the fog network 118. Indeed, the fog network 118 may control access to and/or writing provisions to the smart data stored in the smart data store 120. In this manner, each smart device service 110 and/or other data requestor 112 may request pertinent smart home data from the smart device data store 120, which the personal fog machine 116/local fog network 118 may allow or decline (e.g., based upon input from an operator 122 of the personal fog machine. Thus, the operator 122 (e.g., the owner of the smart device data) may tightly control access to their owned smart device data.

In some instances, as will be discussed in more detail below, the fog network 118 may provide ease of control of devices 108 communicatively coupled to the fog network 118. Indeed, the operator 122 may provide trigger provision, via the local fog network 118, of local commands to the smart devices 108. For example, a universal reset command may wipe personalized settings for the devices 108 from the devices 108, in preparation for a new owner/operator of the devices 108. As will be discussed in more detail below, this type of reset, in some embodiments, may differentiate between personalized settings and settings that should remain with the environment (e.g., are not personalized or are only minimally personalized, but more likely to be settings to retain with the environment). In such a scenario, settings that should be retained for the environment may be retained, while the other settings are reset.

Discovery

Figure 2:
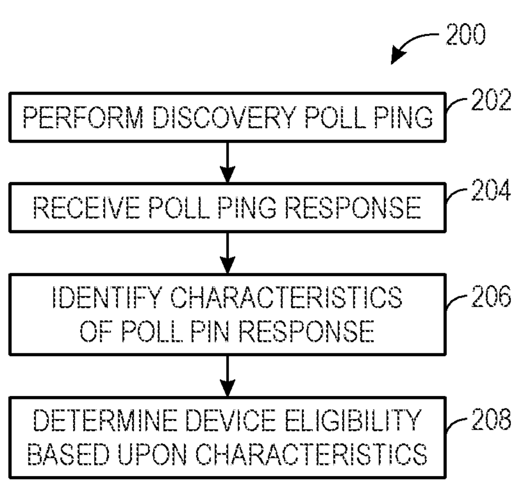
FIG. 2 is a flow chart, illustrating a process for determining device eligibility for connection to a fog network, in accordance with certain embodiments described herein.

Turning now to a more detailed discussion of coupling devices 108 to the fog network 118, FIG. 2 is a flow chart, illustrating a process 200 for determining device eligibility for connection to a fog network, in accordance with certain embodiments described herein. As may be appreciated, it may be difficult to discern all devices within an environment that may provide electronic communications. Accordingly, a discovery process may be implemented to identify such devices, while attempting to reduce potential devices that may be able to communicate via the fog network but may not be associated with the current environment (e.g., are disposed within a neighboring environment, etc.).

The process 200 begins by performing a discovery poll ping (block 202). For example, an electronic signal may be broadcast from the personal fog machine 116, requesting a return signal from any devices 108 that receive the signal.

Based upon providing the discovery poll ping, poll ping responses may be received from devices 108 that receive the discovery poll ping (block 204). The poll ping responses may include an identification of the device 108 providing the response along with any other connection-specific parameters that may be useful for establishing communication between the device 108 and the fog network 118.

Upon receiving the responses, eligibility-deterministic characteristics of the responses may be identified and associated with each of the responses (block 206). For example, a signal strength of the responses may be identified, which may indicate how likely the device 108 that provided the response is to personal fog machine 116, which may be an indication of devices 108 associated with a particular environment.

Device eligibility to connect to the fog machine 116/fog network 118 may be determined based upon the identified characteristics (block 208). For example, the signal strength of the response may be compared to a threshold signal strength, to determine whether the signal strength meets and/or exceeds the threshold signal strength. If it does, the device 108 providing the response may be deemed eligible to connect to the fog machine 116.

Figure 3A:
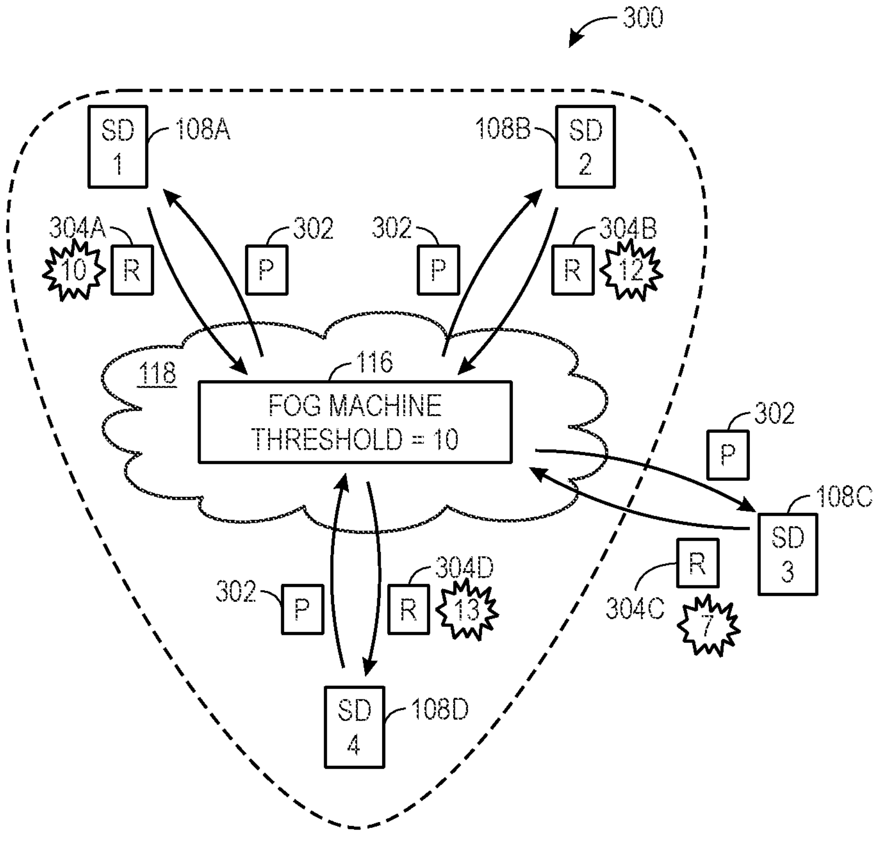
FIG. 3A is a schematic diagram, illustrating eligible/ineligible device determination based upon a discovery poll ping response, in accordance with certain embodiments described herein.

FIG. 3A is a schematic diagram, illustrating eligible/ineligible device determination 300 based upon a discovery poll ping response, in accordance with certain embodiments described herein. As illustrated, devices 108A, 108B, 108C, and 108D each are within communication range of the fog machine 118, which broadcasts a discovery poll ping 302.

In response, each of these devices 108A, 108B, 108C, and 108D provide a corresponding response 304A, 304B, 304C, and 304D. The signal strength threshold for devices is "10" in the current example, indicating that all devices providing a response with at least a signal strength of 10 are eligible to join the fog network 118. Here, responses 304A, 304B, and 304D each have a signal strength that meets or exceeds the threshold. Thus, the devices 108A, 108B, and 108D associated with these responses 304A, 304B, and 304C are each eligible to communicate via the fog network 118.

Figure 3B:
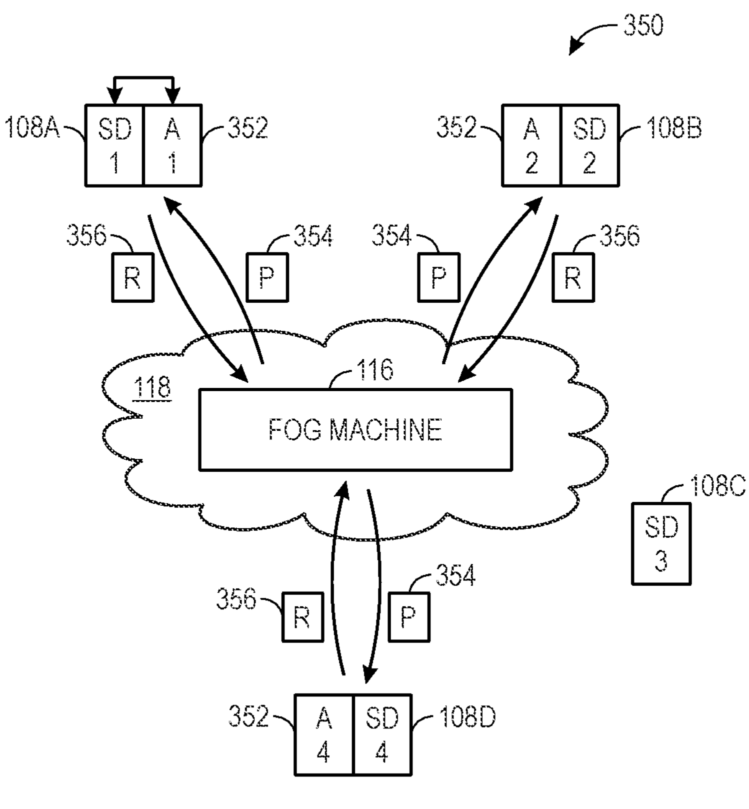
FIG. 3B is a schematic diagram, illustrating eligible/ineligible device determination based upon adapter devices/software coupled to eligible devices, in accordance with certain embodiments described herein.

In another embodiment, adapters may be used to determine eligibility to connect to the fog network 118. For example, FIG. 3B is a schematic diagram, illustrating eligible/ineligible device determination 350 based upon adapter devices/software coupled to eligible devices, in accordance with certain embodiments described herein. In this embodiment, devices are eligible to communicate via the fog network 116 if they are coupled to an adapter 352 authorized to communicate via the fog network 118. In the illustrated example, adapters 352 are coupled to devices 108A, 108B, and 108D, rendering these devices eligible to communicate via the fog network. To facilitate communication, the fog machine 116 may provide a ping 354 to indicate that the fog machine 116 is able to facilitate communications of eligible devices. In response, the eligible devices may send a response 356, providing data to establish the connection to the fog machine 116/fog network 118.

Fog Network Access

Figure 4:
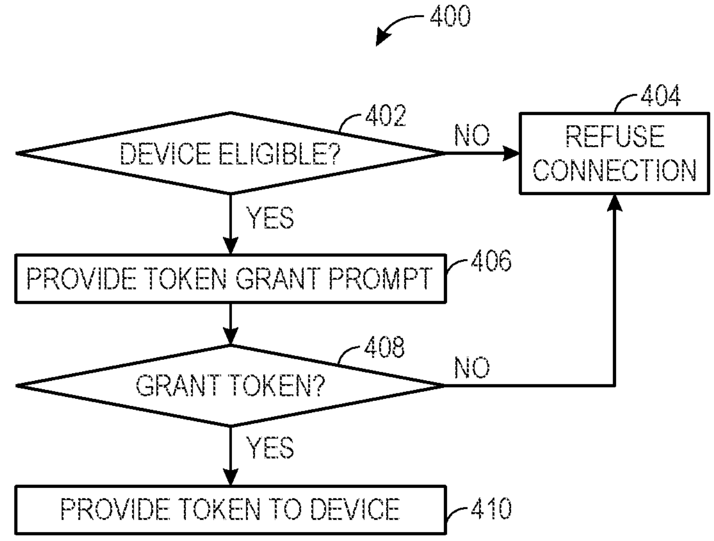
FIG. 4 is a flow chart, illustrating a process for granting access to a fog network based upon eligibility, in accordance with certain embodiments described herein.

Having discussed the discovery process, FIG. 4 is a flow chart, illustrating a process 400 for granting access to a fog network based upon eligibility, in accordance with certain embodiments described herein. The process 400 begins by determining if an identified device is eligible for communication on the fog network (decision block 402). As mentioned above, this may be done by determining whether an adapter is present and/or if characteristics of a signal provided by the device meet defined eligibility criteria.

If the device is not eligible for connection to the fog network, the connection is refused (block 404). However, if the device is eligible for connection to the fog network, in certain embodiments where a token provides access to the token network, a token grant prompt may be provided (e.g., via a graphical user interface (GUI) (block 406).

Next a decision is made whether the token should be granted (decision block 408). For example, an operator may provide an indication to provide the device with access to the fog network or to deny access to the fog network. If the token should not be granted, the connection to the fog network is refused (block 404). However, if the token should be granted, the token is provided to the device, enabling the device to access the fog network (block 410).

Figure 5:
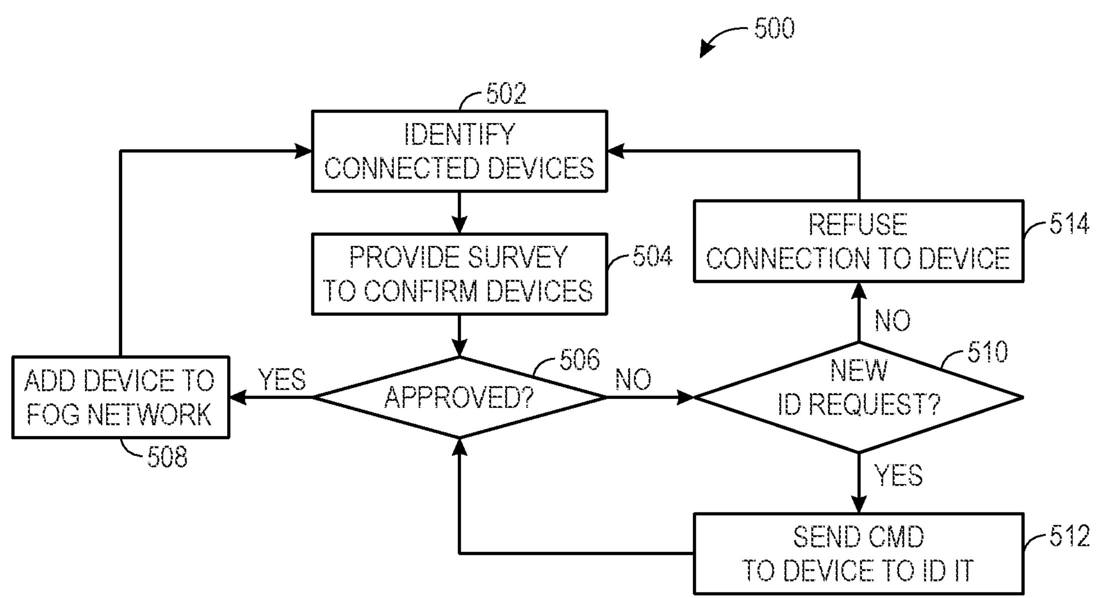
FIG. 5 is a flow chart of a process for discovering devices to connect to a fog network, in accordance with certain embodiments described herein.

FIG. 5 is a flow chart of a process 500 for discovering devices to connect to a fog network, in accordance with certain embodiments described herein. The process 500 begins with identifying devices that can communicatively couple to the fog machine (block 502).

A survey may be provided to confirm that the identified devices should be connected to the fog network (block 504). For example, a graphical user interface may provide a list of detected devices and provide a prompt requesting operator confirmation for each of the devices, indicating that the devices should be able to communicate via the fog network.

Next, based upon the survey, an approval status is determined (decision block 506). If approved, the devices are added to the fog network (e.g., by providing additional connection data to specific approved devices) (block 508).

In some situations, the operator may not be aware what or where a particular identified device is. Accordingly, the operator can provide an identification request via the graphical user interface, rather than approving the device. If, at decision block 510, an identification request is requested, a command specific to the capabilities of the device in question may be provided to the device in question, causing an identification indication to be performed by the device. For example, as illustrated, when the device in question has a light that can be controlled by command, the command may request the device in question to present a particular pattern via the light, in an effort to assist the operator identify the device in question in the environment. Similarly, if the device is question includes a controllable speaker, a command requesting particular audio to be played via the speaker may be provided, in an effort to assist the operator identify the device in question in the environment.

When no identification request is requested and no approval has been provided, the connection of the device to the fog network may be refused (block 514). This may be done via provision of particular data or by simply ignoring the request to connect to the fog network by the device.

Data Communication Via the Fog Network

Figure 6:
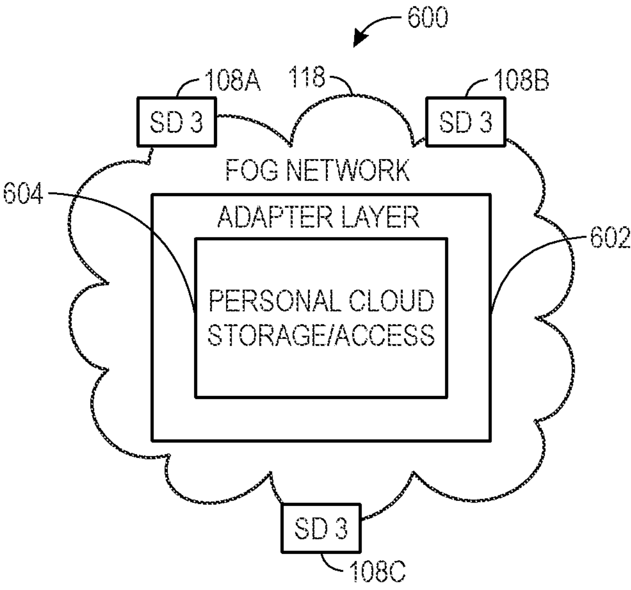
FIG. 6 is a schematic diagram of a fog network with an adapter layer for facilitating data sharing amongst smart devices, in accordance with certain embodiments described herein.

The discussion now turns to device-to-device communication via the fog network. FIG. 6 is a schematic diagram 600 of a fog network 118 with an adapter layer 602 for facilitating data sharing amongst smart devices 108A, 108B, and 108C, in accordance with certain embodiments described herein. As illustrated, each of the devices 108A, 108B, and 108C are connected/have access to the fog network 118, as mentioned above. The devices 108A, 108B, and 108C may communicate data (e.g., captured via sensors) to the adapter layer 602, which may process and translate the data for storage in the personal cloud storage 604. For example, if device 108A provides data in a first format of a first vendor or first type of device and devices 108B and 10C each provide data in a second format of a second vendor or second type of device, the adapter layer may translate the received data into a universal format that may be vendor-agnostic. In some instances, the translation may be into a vendor format of the majority of devices on the fog network 118 or in a format determined to reduce the amount of translation with respect to potential received data in the fog network 118. Thus, in our current example, the data of device 108A may be translated into the second format of devices 108B and 108C. Thus, only data coming from device 108A may require translation to have a universal format.

Figure 7:
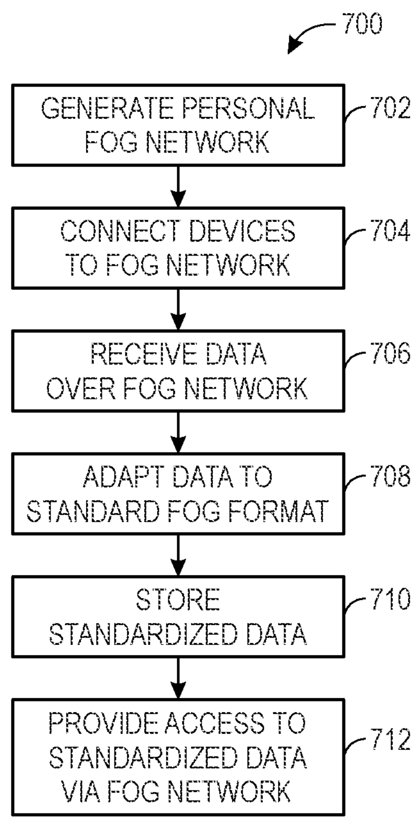
FIG. 7 is a flow chart of a process for providing access to fog network data, in accordance with embodiments described herein, in accordance with certain embodiments described herein.

FIG. 7 is a flow chart of a process 700 for providing access to fog network data, in accordance with embodiments described herein, in accordance with certain embodiments described herein. The process 700 begins by generating a personal fog network (block 702). Devices are connected to the fog network (block 702) (e.g., as discussed above). Data is received over the fog network (block 706). The data is adapted to the universal fog format, as described with respect to FIG. 6 (block 708). The adapted data is stored in the fog network data store (block 710) and access to the adapted data is provided via the fog network based upon authorization of an operator of the fog machine (block 712).

Figure 8:
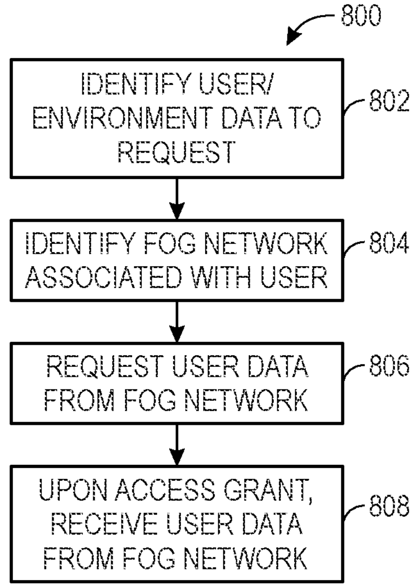
FIG. 8 is a flow chart of a process for granting access to data of a fog network, in accordance with certain embodiments described herein.

FIG. 8 is a flow chart of a process 800 for granting access to data of a fog network, in accordance with certain embodiments described herein. The process 800 begins with identifying particular data to request (block 802). For example, a particular electronic service request may be associated with a particular user or particular environment. In such a case, a subset of data related to the particular user and/or particular environment may be desired.

Based upon identifying the particular user and/or particular environment, identify a fog network associated with the particular user and/or particular environment (block 804). For example, a fog network naming service may provide an indication of a fog network associated with the particular user and/or particular environment.

Once the fog network is identified, the desired data may be requested directly from the identified fog network (block 806). Upon an access grant (e.g., via a graphical user interface prompt response from an operator of the fog machine), the user data may be received from the fog network (block 808). In this manner access to the operator's personal data or data pertaining to the operator's environment may be controlled by the operator rather than a third party.

Figure 9:
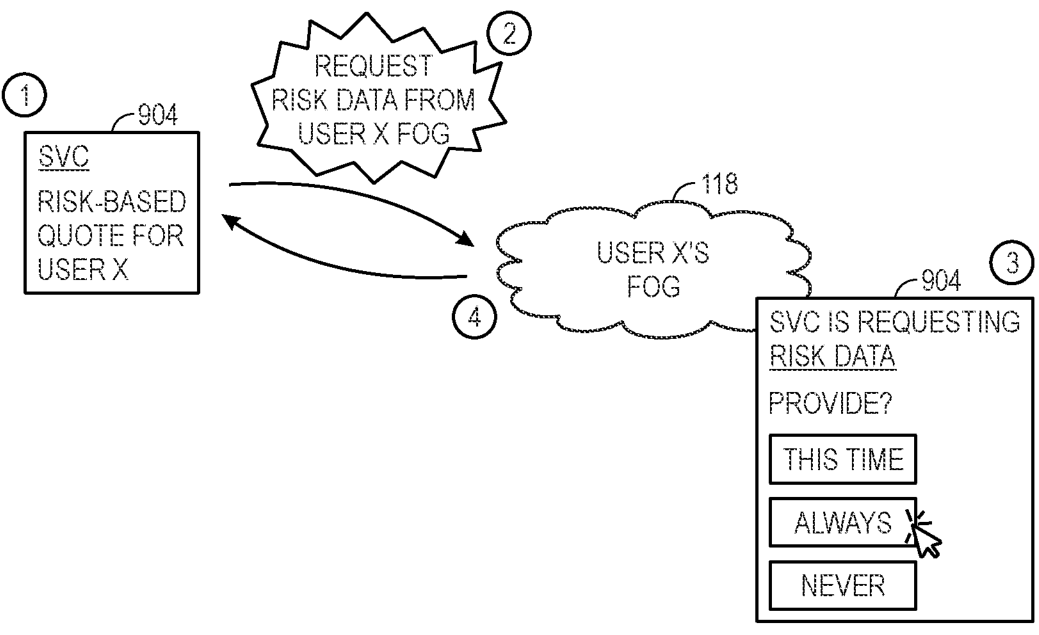
FIG. 9 is a schematic diagram illustrating data provision to a requesting network service, via the fog network, in accordance with certain embodiments described herein.

FIG. 9 is a schematic diagram 900 illustrating data provision to a requesting network service 902, via the fog network 118, in accordance with certain embodiments described herein. The network service 902 is providing a risk-based analysis service for a particular user, "User X". Upon identifying the fog network associated with User X, the service 902 requests risk-relevant data pertaining to User X from the identified fog network 118.

As illustrated in GUI 904, the operator of the fog network 118/fog machine may receive a prompt indicating that the service 904 is requesting particular data from the fog network 118 and may grant access either temporarily, always, or decline access temporarily and/or always. Based upon the operator's selection, data obtained via granted access may be provided back to the service 904.

In some embodiments, the data provided back to the service 904 may be transformed to require additional data for the data to be intelligible. For example, the data may be encrypted with keys stored and accessible via a block chain. The access rights provided via the GUI 904 may grant access to or decline access to the keys on the blockchain, thereby rendering data provided service provider useless when key access is revoked.

As may be appreciated, by retaining data at the local level rather than with the service provider, there may be many security benefits. For example, mass amounts of particular types of data for a multitude of users may not be stored at the service provider, mitigating data breach losses at the service provider.

Figure 10:
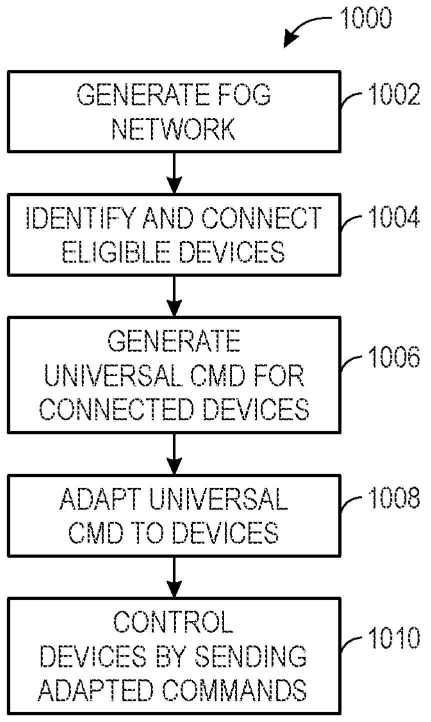
FIG. 10 is a flow chart of a process for universal control of devices on a fog network, in accordance with certain embodiments described herein.

FIG. 10 is a flow chart of a process 1000 for universal control of devices on a fog network, in accordance with certain embodiments described herein. The process 1000 begins by generating a fog network, as discussed above (block 1002). Eligible devices are identified and connected, as discussed above (block 1004).

Universal commands may be generated for the connected devices (block 1006). The universal command is commands to perform a common activity for devices connected to the fog network. For example, a universal command may be generated to reset the devices and/or delete personal account information from the devices connected to the fog network.

The universal command may be adapted/transformed into device-specific commands (block 1008) that are sent to the devices to control the devices to perform the common activity. To adapt/transform the universal commands, an API of each device may be accessed to perform the common activity provided by the universal command. Upon receiving the device-specific commands, the devices can implement the device-specific commands.

Figure 11:
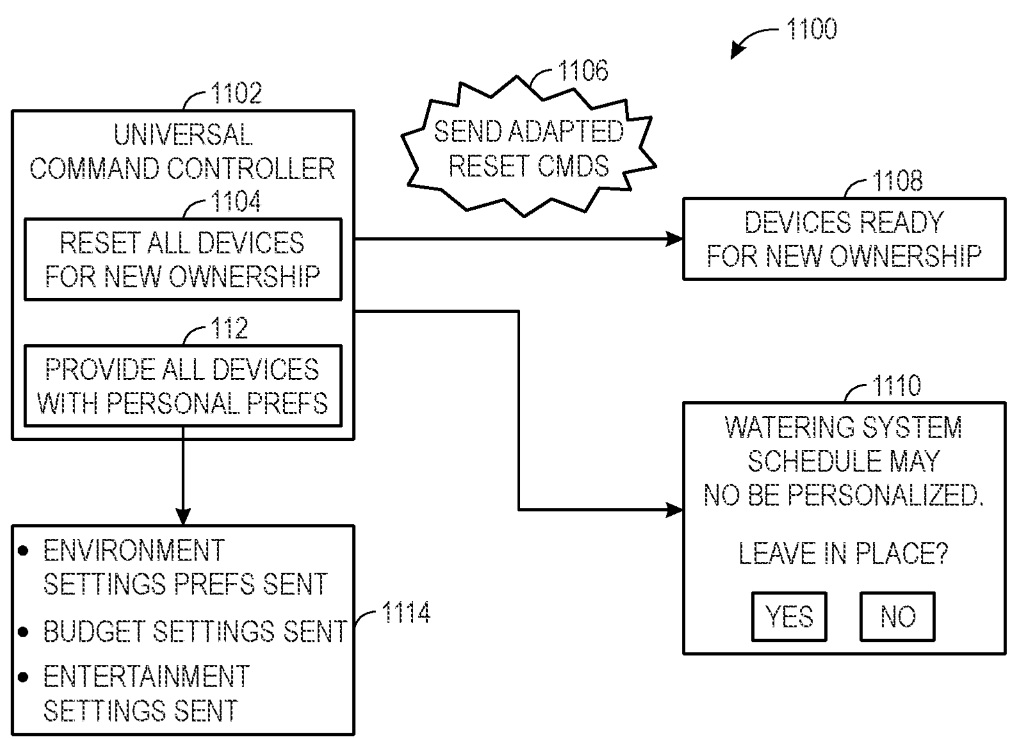
FIG. 11 is a schematic diagram illustrating universal control of devices connected to a fog network, in accordance with certain embodiments described herein.

FIG. 11 is a schematic diagram 1100 illustrating universal control of devices connected to a fog network, in accordance with certain embodiments described herein. A GUI 1102 of a universal command controller provides options to generate/trigger universal commands. For example, option 1104 generates/triggers a universal command to reset all devices on a fog network for new ownership. Upon selection, the universal command is adapted to device-specific reset commands 1106 that are sent to the devices on the fog network. GUI 1108 shows a resultant screen indicating that the reset is complete and the devices are ready for new ownership.

Option 1112, when selected, generates/triggers a universal command to provide all devices with personal preferences. As illustrated in GUI 1114, this may result in device-specific commands that, when executed, cause operator preferences to be stored on the devices. For example, as illustrated, environmental setting preferences (e.g., temperature preferences, etc.), budget settings, entertainment settings, etc. may be sent to relevant devices connected to the fog network.

Figure 12:
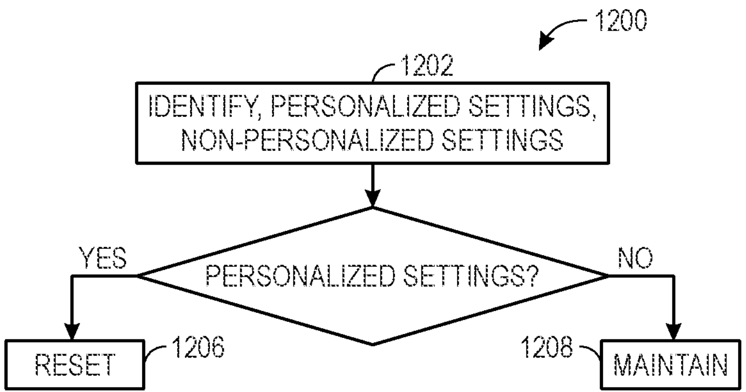
FIG. 12 is a flow chart of a process for distinguishing between personalized settings and non-personalized settings for a universal reset, in accordance with certain embodiments described herein.

In some embodiments, the universal reset command may filter out what is reset on the connected devices. FIG. 12 is a flow chart of a process 1200 for distinguishing between personalized settings and non-personalized settings for a universal reset, in accordance with certain embodiments described herein. The process 1200 begins by identifying whether settings stored on the devices are personalized settings or non-personalized settings. In one embodiment, this can be done by identifying whether particular settings are non-personalized (e.g., common to many users or within a threshold range of averaged values of a set of users) or are highly personalized (e.g., uncommon to many users or outside a threshold range of averaged values for a set of users). For example, usernames and passwords may be highly personalized (varying from household to household) and, thus, may be considered personalized settings. However, sprinkler settings may be specific to a home/neighborhood rather than an individual and may be considered non-personalized. There are many alternative ways of identifying personalized vs non-personalized settings. Machine learning models can help identify personalized vs. non-personalized settings via a trained model.

At decision block 1204, if the setting is a personalized setting, it is reset (e.g., deleted) (block 1206). However, if the setting is not a personalized setting it is maintained (block 1208). In this manner, certain settings may remain set in an environment, while personalized settings are removed from all connected devices. Returning to FIG. 11, GUI 1110 illustrates a prompt indicating that the watering system may be a non-personalized setting and asking if these settings should be maintained or reset. The operator may indicate whether the settings should be maintained, and a device-specific command may be sent to the watering system in accordance with that indication.

Figure 13:
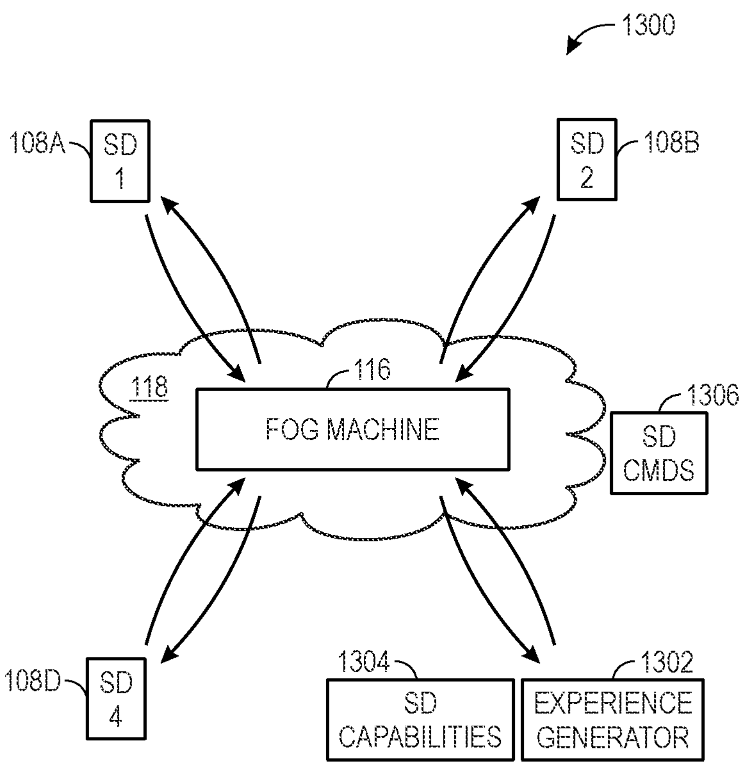
FIG. 13 is a schematic diagram, illustrating an experience generator that may communicate with devices on a fog network, in accordance with certain embodiments described herein.
Figure 14:
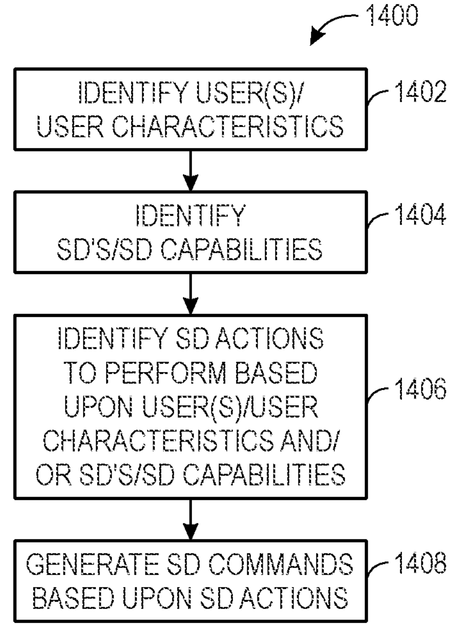
FIG. 14 is flow chart, illustrating a process for generating an experience via the experience generator of FIG. 13, in accordance with certain embodiments described herein.

FIG. 13 is a schematic diagram, illustrating a system 1300 with an experience generator 1302 that may communicate with devices (e.g., devices 108A, 108B, 108D) connected to a fog machine 116 on a fog network 118, in accordance with certain embodiments described herein. FIG. 14 is flow chart, illustrating a process 1400 for generating an experience via the experience generator of FIG. 13, in accordance with certain embodiments described herein. For clarity, these figures will be discussed together.

To devise an experience, the experience generator 1302 identifies the users and/or user characteristics (block 1402). The user/user characteristics may be used to identify aspects of the desired experience.

The experience generator may identify capabilities of the devices on the fog network 118 (e.g., devices 108A, 108B, 108D) by receiving smart device capability data 1304 from the connected devices 108A, 108B, 108D (block 1404). Depending on the experience desired, the experience generator may harness the smart device capabilities to generate the desired experience. To do this, the experience generator may identify smart device actions to perform to result in the desired experience identified based upon the user/user characteristics (block 1406). The experience generator 1302 may generate smart devices commands 1405 based upon the identified smart device actions (block 1408).

A wide variety of experiences may be generated by the experience generator. For example, in an art gallery, an immersive experience may be provided by commanding electronic devices coupled to a fog machine in the gallery to perform immersive experience actions, such as producing sounds, lights, etc. In some embodiments, varied experiences may be provided by maintaining a history of previous experiences observed by the user and varying a current experience from those experienced in the past.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:

one or more smart devices;

a local fog machine, comprising electronic hardware configured to:

generate a fog network local to an environment of the local fog machine that provides communication access to devices connected to the fog network, wherein eligibility of connection to the fog network is based upon being local to the environment;

provide a discovery poll ping to the one or more smart devices;

in response to the discovery poll ping, receive a poll ping response;

identify characteristics of the poll ping response that indicate whether a corresponding one of the one or more smart devices is local to the environment and, thus, eligible to join the fog network based upon eligibility criteria comprising operational characteristic requirements for an eligible smart device, specific to the fog network, wherein the eligibility criteria comprises:

a threshold signal strength of the poll ping response, wherein the threshold signal strength comprises a signal strength value that, when reached by the poll ping response, indicates that the one or more smart devices providing the poll ping response is likely local to the environment and is, thus, eligible;

a capability performance indication of eligibility, provided based upon observed completion of commanded performance, by the eligible smart device, of an advertised capability of the eligible smart device, within the environment of the local fog machine; or any combination thereof;

determine eligibility of the one or more smart devices to join the fog network by comparing the characteristics of the poll ping response to the eligibility criteria; and when the one or more smart devices are eligible to join the fog network, provide access to the fog network by the one or more smart devices.

2. The system of claim 1, wherein the poll ping response comprises a device identification indication of a corresponding one of the one or more smart devices.

3. The system of claim 1, wherein the poll ping response comprises one or more connection-specific parameters of a corresponding one of the one or more smart devices, used to facilitate establishing communication between the corresponding one of the one or more smart devices and the fog network.

4. The system of claim 1, wherein the characteristics comprise a signal strength of the poll ping response.

5. The system of claim 4, wherein the local fog machine is configured to determine the eligibility based upon the signal strength meeting the threshold signal strength.

6. The system of claim 1, wherein the characteristics comprise an indication that a providing smart device of the one or more smart devices is coupled to an adapter authorized to communicate via the fog network as indicated by an adapter-based fog network communication requirement.

7. The system of claim 1, wherein the local fog machine is configured to provide access to the fog network by the one or more smart devices, by:

in response to determining that one of the one or more smart devices is eligible to connect the fog network, provide a token facilitating access to the fog network to the one of the one or more smart devices.

8. The system of claim 7, wherein the local fog machine is configured to provide access to the fog network by the one or more smart devices, by:

providing a token grant prompt requesting whether the one of the one or more smart devices should be granted access to fog network;

in response to receiving an indication that access should be granted to the one of the one or more smart devices, provide the token; and otherwise, in response to not receiving an indication that access should be granted to the one of the one or more smart devices, refrain from providing the token.

9. The system of claim 1, wherein the local fog machine is configured to determine the eligibility based upon the capability performance indication of eligibility, provided based upon performance, by the eligible smart device, of the advertised capability of the eligible smart device, within the environment of the local fog machine.

10. The system of claim 9, wherein the capability comprises presenting light, sound, or both, identifying the eligible smart device.

11. The system of claim 1, wherein the local fog machine is configured to:

receive, from a distributed smart device service, a request for data from the fog network;

provide a prompt requesting permission to provide the data based upon the request; and in response to receiving an indication granting the permission, provide the data to the distributed smart device service; and otherwise, in response to not receiving an indication granting the permission, refrain from providing the data to the distributed smart device service.

12. The system of claim 1, wherein the local fog machine is configured to:

receive a request to perform a universal command on smart devices connected to the fog network;

generate device-specific commands for the smart devices connected to the fog network by adapting the universal command to the device-specific commands;

perform the universal command by proving the device-specific commands to the smart devices connected to the fog network.

13. The system of claim 12, wherein the universal command comprises a reset command to remove personal customizations from the smart devices connected to the fog network.

14. A tangible, non-transitory, computer-readable medium, comprising computer-readable instructions that when executed by one or more processors of one or more computers, cause the one or more computers to:

generate, via a local fog machine, a fog network local to an environment of the local fog machine that provides communication access to a subset of one or more smart devices connected to the fog network, wherein eligibility of connection to the fog network is based upon being local to the environment;

provide a discovery poll ping to the one or more smart devices;

in response to the discovery poll ping, receive a poll ping response;

identify characteristics of the poll ping response that indicate whether a corresponding one of the one or more smart devices is local to the environment and, thus, eligible to join the fog network based upon eligibility criteria comprising operational characteristic requirements for an eligible smart device, specific to the fog network, wherein the eligibility criteria comprises:

a threshold signal strength of the poll ping response, wherein the threshold signal strength comprises a signal strength value that, when reached by the poll ping response, indicates that the one or more smart devices providing the poll ping response is likely local to the environment and is, thus, eligible;

a capability performance indication of eligibility, provided based upon observed completion of commanded performance, by the eligible smart device, of an advertised capability of the eligible smart device, within the environment of the local fog machine; or any combination thereof;

determine eligibility of the one or more smart devices to join the fog by comparing the characteristics of the poll ping response to the eligibility criteria; and when the one or more smart devices are eligible to join the fog network, provide access to the fog network by the one or more smart devices.

15. The tangible, non-transitory, computer-readable medium of claim 14, comprising computer-readable instructions that when executed by the one or more processors, cause the one or more computers to:

determine the eligibility based upon a signal strength of the poll ping response meeting the threshold signal strength indicative of the poll ping response being provided within the environment.

16. The tangible, non-transitory, computer-readable medium of claim 14, comprising computer-readable instructions that when executed by the one or more processors, cause the one or more computers to:

determine the eligibility based upon an indication that a providing smart device of the one or more smart devices is coupled to an adapter authorized to communicate via the fog network as indicated by an adapter-based fog network communication requirement.

17. The tangible, non-transitory, computer-readable medium of claim 14, comprising computer-readable instructions that when executed by the one or more processors, cause the one or more computers to:

determine the eligibility based upon the capability performance indication of eligibility, provided based upon performance, by the eligible smart device, of the advertised capability of the eligible smart device, within the environment of the local fog machine.

18. The tangible, non-transitory, computer-readable medium of claim 17, wherein the capability comprises presenting light, sound, or both.

19. A computer-implemented method, implemented via a local fog machine, comprising electronic hardware to perform operations comprising:

generating a fog network local to an environment of the local fog machine that provides communication access to devices connected to the fog network, wherein eligibility of connection to the fog network is based upon being local to the environment;

providing a discovery poll ping to one or more smart devices;

in response to the discovery poll ping, receiving a poll ping response;

identify characteristics of the poll ping response that indicate whether a corresponding one of the one or more smart devices is local to the environment and, thus, eligible to join the fog network based upon eligibility criteria comprising operational characteristic requirements for an eligible smart device, specific to the fog network, wherein the eligibility criteria comprises:

a threshold signal strength of the poll ping response, wherein the threshold signal strength comprises a signal strength value that, when reached by the poll ping response, indicates that the one or more smart devices providing the poll ping response is likely local to the environment and is, thus, eligible;

a capability performance indication of eligibility, provided based upon observed completion of commanded performance, by the eligible smart device, of an advertised capability of the eligible smart device, within the environment of the local fog machine; or any combination thereof;

determining eligibility of the one or more smart devices to join the fog network by comparing the characteristics of the poll ping response to the eligibility criteria; and when the one or more smart devices are eligible to join the fog network, providing access to the fog network by the one or more smart devices.

20. The computer-implemented method of claim 19, comprising: determining the eligibility based upon:

the capability performance indication of eligibility, provided based upon performance, by the eligible smart device, of the advertised capability of the eligible smart device, within the environment of the local fog machine.

* * * * *